April 21, 1925.                                                    1,534,798
W. McMILLAN
COUPLING FOR PNEUMATIC HOSE PIPES
Filed June 10, 1924
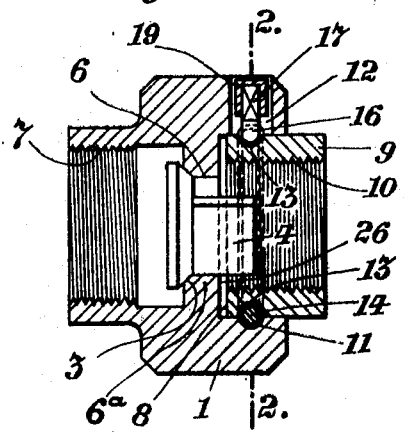
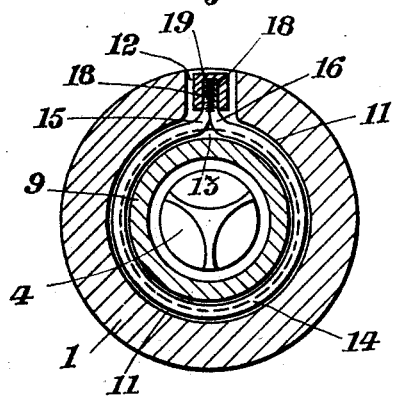
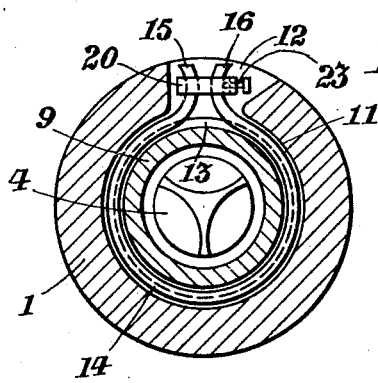
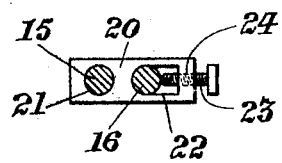
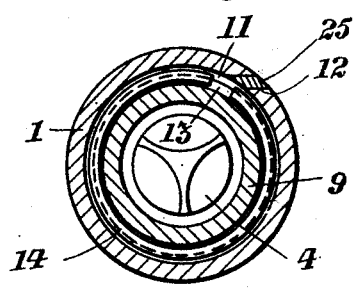
INVENTOR
William McMillan.
BY
ATTORNEYS Patented Apr. 21, 1925.

1,534,798

UNITED STATES PATENT OFFICE.

WILLIAM McMILLAN, OF BELFAST, IRELAND.

COUPLING FOR PNEUMATIC HOSE PIPES.

Application filed June 10, 1924. Serial No. 719,049.

*To all whom it may concern:*

Be it known that I, WILLIAM McMILLAN, 5 Franklin Street, Belfast, Ireland, a subject of the King of Great Britain and Ireland, have invented certain new and useful Improvements Relating to Couplings for Pneumatic Hose Pipes, of which the following is a specification.

This invention relates to hose pipe couplings, of the kind provided with automatic valves and adapted for the supply of compressed air to pneumatic tools and the like.

According to the present invention, the coupling comprises two inter-engaging members, which are relatively turnable but are incapable of relative axial movement, each of said members being formed with an annular groove adapted, when the members are in their operative positions, to form part of an annular chamber wherein a wire ring is removably, or otherwise, inserted for the purpose of preventing relative axial movement of said members.

Under one construction, the interior wall at one end of one of the inter-engaging members, or body of the coupling, is formed with a substantially semi-circular groove and with an aperture leading thereto from its exterior, said groove, when the two members are engaged, co-acting with a similar groove formed in the exterior wall of the other of said members, or revoluble nut, to form an annular chamber of circular cross section wherein a wire ring is inserted through said aperture. In order to be able to remove the wire ring from the chamber, it is arranged to be of such a length that its two ends, which project into the aperture, can be engaged by a suitable fastening device disposed within said aperture. Thus, the wire ring can be withdrawn from the annular chamber by removing the fastening device and pulling on one of the ends of the ring.

In another construction, however, the wire ring is not made sufficiently long for its ends to project into the aperture in the body of the coupling to be engaged by a fastening device and, after the insertion of the ring into the annular groove, said aperture is plugged, the ring being completely enclosed.

Constructional embodiments of air valve couplings for pneumatic tools are illustrated, by way of example, on the annexed drawing.

Fig. 1 is a longitudinal section and Fig. 2 a transverse section on the line 2—2 in Fig. 1, of one construction of coupling.

Fig. 3 is a transverse section of another construction.

Fig. 4 is a plan view, to a larger scale, of a device for securing the free ends of the wire ring illustrated in Fig. 3, and Fig. 5 is a transverse section of another modification.

Referring to the drawing:—

The coupling is preferably made of non-corrosive material and comprises a body 1 wherein is formed a valve seat 3 adapted to be engaged by a valve 4 slidably guided in an aperture 6 arranged in an internal shoulder $6^a$ formed in the body. The valve, when the tool is disconnected, is held on its seat by the pressure fluid in the pipe line and is moved therefrom automatically when the coupling is jointed to the tool. The body is screw threaded internally at 7 and is formed with a recess 8 wherein one end of a coupling nut 9, screw threaded internally at 10, is turnably arranged. The screw threads 7 of the body 1 are adapted to be engaged by the screw threads of the usual air strainer or the hose pipe and the screw threads 10 by the end of the pneumatic hammer or other pneumatic tool. The body 1 is also formed in its interior with an annular groove 11 of semi-circular cross section and with an aperture 12 leading thereto from the exterior, said groove, when the inter-engaging body 1 and nut 9 are assembled, as shown in Fig. 1, co-acting with a similar groove 13 formed in the exterior of said nut. The grooves 11 and 13 together form an annular chamber wherein a wire ring 14 is inserted through the aperture 12.

In the coupling illustrated in Figs. 1 and 2, the ends 15 and 16 of the ring 14 are, before fitting the ring into position, formed with flats 17 on their inner faces which, when the ring is in position, are applied to each other in the manner illustrated, at Fig. 2, their exteriors being formed with screw threads 18. The ring is then passed through the aperture 12 into the annular chamber formed by the co-acting grooves 11 and 13 and the ends 15 and 16 of said ring, projecting into said aperture, are turned outwards away from the centre of the coupling. An internally screw threaded cap-nut 19 is then screwed on to the screw threads 18 so as to retain the two ends of the ring against relative movement. In order to remove the wire ring and disengage the parts 1, 9, of the coupling, it is only necessary to unscrew the cap-nut 19 and pull on one or other of the ends 15 and 16 of said ring until it is pulled out of the co-acting grooves 11 and 13.

In Fig. 3 the two ends 15 and 16 of the wire ring are shown secured against relative movement by means of a clamp 20 comprising a body formed with an aperture 21 and an elongated aperture 22, a clamping pin 23 being screwed through a screw threaded aperture 24 formed in the body 20. The ring is passed through the wide aperture 12 into the annular chamber formed by the co-acting grooves 11 and 13 and the end 15 of the ring is passed through the aperture 21 in the body 20 of the clamp and bent over slightly so that it will not work its way out of said aperture. The end 16 of the ring 14 is arranged within the elongated aperture 22 and the clamping pin 23 is screwed inwards to tighten the said end firmly against the central part of the body of the clamp, thus retaining it fixed within the aperture 22.

When the pneumatic tool is screwed into the nut 9 its end bears against the wall 26 of the recess 8 in the body 1 of the coupling, thus forming a fluid-tight joint and preventing the escape of fluid through the aperture 12 in said body.

In cases where it is not required to separate the body 1 and nut 9 after having been once assembled, the ring, as shown in Fig. 5, is made shorter than the rings shown in Figs. 1 and 2 and Fig. 3 and has no projecting ends adapted to be secured by a fastening device. The ring is inserted through the aperture 12 in the body 1 of the coupling, and the aperture is then closed by means of a plug 25, whereupon the parts 1, 9, are permanently joined together.

It will be understood that in each construction of coupling described the inter-action of the ring 14 with the grooves 13 and 11 in the body 1 and nut 9, respectively, permits of the body or the nut turning freely relatively to the nut or body, as the case may be, whilst relative axial movement of the two parts of the coupling is positively prevented. Thus the pneumatic tool can be connected or disconnected by turning the coupling nut 9 in the required direction without turning the body 1 secured to the hose pipe.

It will also be understood that equivalent fastening devices, other than those described may be used for securing the two ends of the wire ring 14.

Having now fully described my invention what I claim and desire to secure by Letters Patent is:—

1. A coupling for air pipes comprising, in combination, a body, a member fitted therein, a flexible member disposed between said body and member fitted therein, for permitting relative turnable movement thereof while preventing relative axial movement, and means for securing the ends of said flexible member against relative movement and for permitting said flexible member to be removed from between the body and member fitted therein.

2. A coupling for air pipes comprising, in combination, a body, a member fitted therein, a flexible member disposed between said body and member, for permitting relative turnable movement thereof while preventing relative axial movement, means for securing the ends of the flexible member against relative movement and for permitting said flexible member to be removed from between the body and member fitted therein, a valve seat formed in one of said members, and a valve slidably arranged in the coupling and adapted to co-act with said valve seat.

3. A coupling for air pipes comprising, in combination, a body, a member fitted therein, a flexible member disposed between said body and member fitted therein, for permitting relative turnable movement thereof while preventing relative axial movement, and a removable fastening device for securing the ends of the flexible member against relative movement and for permitting said flexible member to be removed from between said body and member fitted therein.

4. A coupling for air pipes comprising, in combination, a body, a member fitted therein, a flexible member disposed between said body and member fitted therein, for permitting relative turnable movement thereof while preventing relative axial movement, a removable fastening device for securing the ends of the flexible member against relative movement and for permitting said flexible member to be removed from between said body and member fitted therein, a valve seat formed in one of said members, and a valve slidably arranged in the coupling and adapted to co-act with said valve seat.

5. A coupling for air pipes comprising, in combination, a body, a member fitted therein, a wire ring disposed between said body and member, for permitting relative turnable movement thereof while preventing relative axial movement, and a removable fastening device for securing the ends of the ring against relative movement and for permitting the ring to be removed from between the body and member fitted therein.

6. A coupling for air pipes, comprising, in combination, a body, a member fitted therein, a wire ring disposed between said body and member, for permitting relative turnable movement thereof while preventing relative axial movement, a removable fastening device for securing the ends of the ring against relative movement and for permitting the ring to be removed from between the body and member fitted therein, a valve seat formed in one of said members, and a valve slidably arranged in the coupling and adapted to co-act with said valve seat.

7. A coupling for air pipes comprising, in combination, a body, a member fitted therein, an annular groove formed in the interior of said body, an annular groove formed at the exterior of said member, said grooves co-acting to form an annular chamber, a flexible member disposed in said chamber, for permitting relative turnable movement of said body and member fitted therein while preventing relative axial movement thereof, and means for securing the ends of said flexible member against relative movement and for permitting said flexible member to be removed from said annular chamber.

8. A coupling for air pipes, comprising, in combination, a body, a member fitted therein, an annular groove formed in the interior of said body, an annular groove formed at the exterior of said member, said grooves co-acting to form an annular chamber, a flexible member disposed in said chamber, for permitting relative turnable movement of said body and member fitted therein while preventing relative axial movement thereof, means for securing the ends of said flexible member against relative movement and for permitting said flexible member to be removed from said annular chamber, a valve seat formed in said body, and a valve slidably arranged in the body and adapted to co-act with said valve seat.

9. A coupling for air pipes, comprising, in combination, a body, a member fitted therein, an annular groove formed in the interior of the body, an annular groove formed at the exterior of said member, said grooves co-acting to form an annular chamber, a wire ring disposed in said chamber, for permitting relative turnable movement of said body and member while preventing relative axial movement thereof, and a removable fastening device for securing the ends of the ring against relative movement and for permitting the ring to be removed from said chamber.

10. A coupling for air pipes comprising, in combination, a body, a member fitted therein, an annular groove formed in the interior of the body, an annular groove formed at the exterior of said member, said grooves co-acting to form an annular chamber, a wire ring disposed in said chamber, for permitting relative turnable movement of said body and member while preventing relative axial movement thereof, a removable fastening device for securing the ends of the ring against relative movement and for permitting the ring to be removed from said chamber, a valve seat formed in said body, and a valve slidably arranged in the body and adapted to co-act with said valve seat.

11. A coupling for air pipes comprising, in combination, a body, a nut fitted therein, an annular groove formed in the interior of the body, an annular groove formed at the exterior of the nut, said grooves co-acting to form an annular chamber, an aperture formed in said body and connecting the exterior thereof to the annular chamber, a wire ring inserted through said aperture and disposed in said chamber, for permitting relative turnable movement of said body and nut while preventing relative axial movement thereof, a removable fastening device for securing the ends of the ring against relative movement and for permitting the ring to be removed from said chamber, a valve seat formed in said body, and a valve slidably arranged in said body and adapted to co-act with said valve seat.

12. A coupling for air pipes comprising, in combination, a body, a recess formed at one end thereof, a nut fitted in said recess, an annular groove formed in the interior of said body within the recess, an annular groove formed at the exterior of said nut, said grooves co-acting to form an annular chamber, an aperture formed in said body and connecting the exterior thereof with said chamber, a wire ring inserted through said aperture and disposed in said chamber, for permitting relative turnable movement of said body and nut while preventing relative axial movement thereof, a removable fastening device, disposed within said aperture, for securing the ends of said ring against relative movement and for permitting the ring to be removed from said chamber, an internal shoulder formed in the body, a valve seat formed in the shoulder, an aperture in the shoulder, and a valve slidable in said aperture and adapted to co-act with said valve seat.

In testimony whereof I affix my signature in presence of two witnesses.

WILLIAM McMILLAN.

Witnesses:
ANDREW HAMILTON,
HARRY WALTER ALLSOP.